D. SPENSLEY.
RIDING ATTACHMENT FOR AGRICULTURAL IMPLEMENTS.
APPLICATION FILED DEC. 31, 1906.

918,386.

Patented Apr. 13, 1909.
2 SHEETS—SHEET 1.

Dewitt Spensley, Inventor,

Witnesses
Howard D. Orr.
B. G. Foster

By E. G. Siggers
Attorney

THE NORRIS PETERS CO., WASHINGTON, D. C.

D. SPENSLEY.
RIDING ATTACHMENT FOR AGRICULTURAL IMPLEMENTS.
APPLICATION FILED DEC. 31, 1906.
918,386. Patented Apr. 13, 1909.
2 SHEETS—SHEET 2.
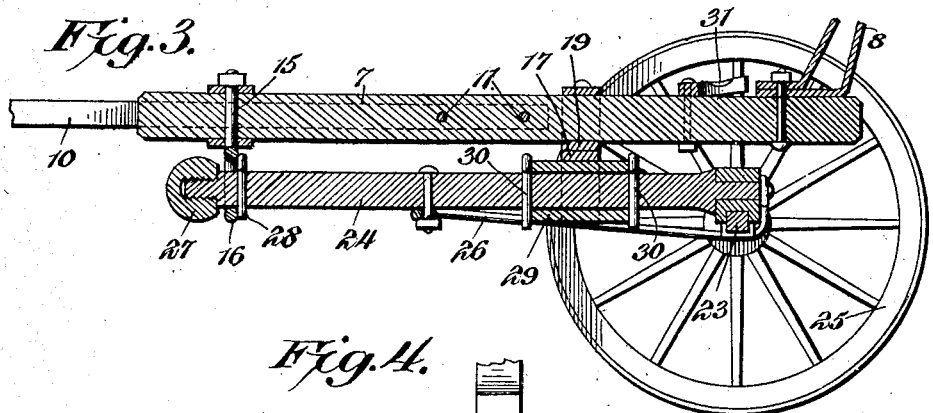
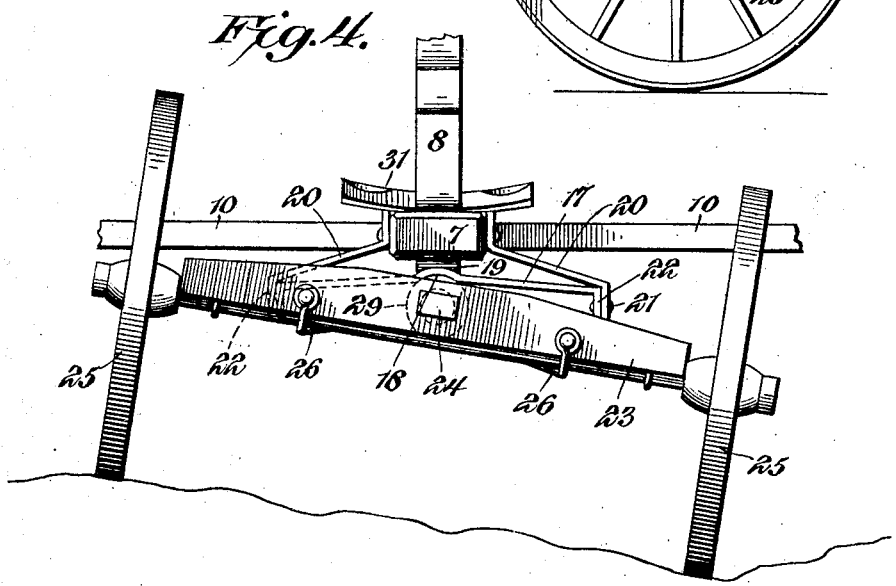
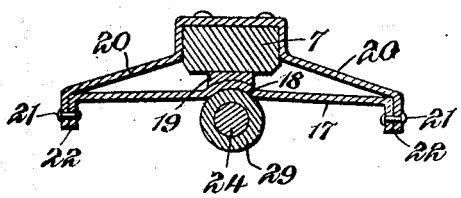
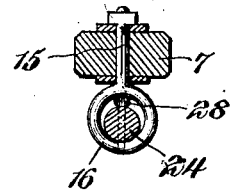
Witnesses
Howard D. Orr
Dewitt Spensley, Inventor,
By E. G. Siggers
Attorney

UNITED STATES PATENT OFFICE.

DEWITT SPENSLEY, OF AURORA, IOWA.

RIDING ATTACHMENT FOR AGRICULTURAL IMPLEMENTS.

No. 918,386.           Specification of Letters Patent.           Patented April 13, 1909.

Application filed December 31, 1906. Serial No. 350,155.

*To all whom it may concern:*

Be it known that I, DEWITT SPENSLEY, a citizen of the United States, residing at Aurora, in the county of Buchanan and State of Iowa, have invented a new and useful Riding Attachment for Agricultural Implements, of which the following is a specification.

This invention relates to improvements in means for carrying the drivers of harrows or other implements.

The principal object is to provide a simple, novel and practicable structure wherein the wheels or other ground support for the seat may follow the unevenness of the ground without tilting said seat, thus avoiding the danger of unseating the driver where the surface is rough.

A still further and important object is to provide a structure of the above character that will properly trail after the harrow or other implement, and will make necessary turns and curves without regard to the slope or roughness of the ground.

The preferred form of construction is illustrated in the accompanying drawings, wherein:—

Figure 1:
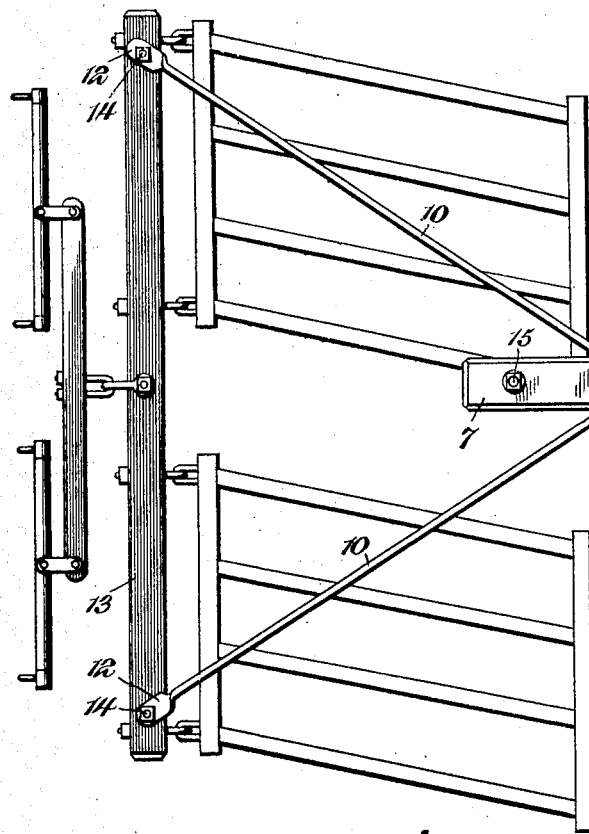
Figure 2:
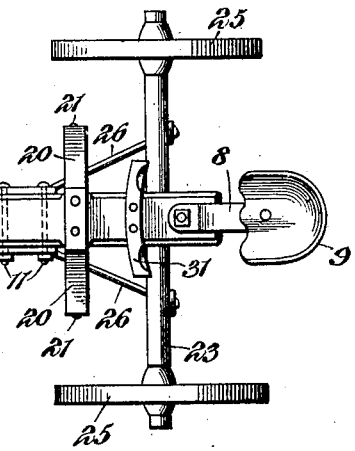
Figure 2:
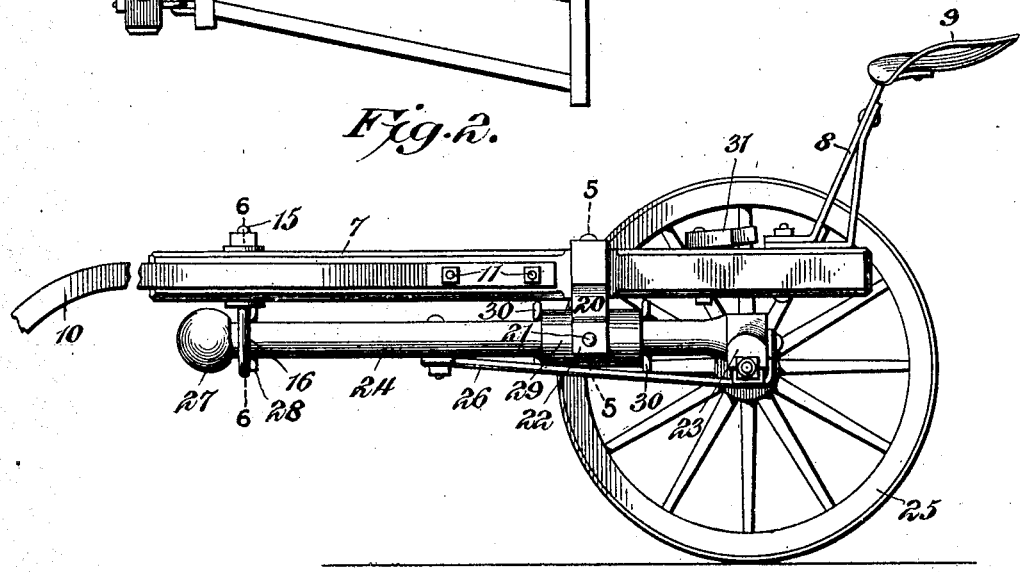

Figure 1 is a top plan view of the riding attachment, showing the same associated with a harrow. Fig. 2 is a side elevation on an enlarged scale of said riding attachment. Fig. 3 is a longitudinal sectional view through the same. Fig. 4 is a rear elevation showing the wheels operating on a slope. Fig. 5 is a cross sectional view on the line 5—5 of Fig. 2. Fig. 6 is a detail sectional view on the line 6—6 of Fig. 2.

Similar reference numerals designate corresponding parts in all the figures of the drawings.

In the embodiment illustrated, a carrier is employed that is in the form of a beam 7 having a suitable standard 8 mounted on its rear end that carries a seat 9 for the driver. Forwardly divergent reach bars 10 have their rear ends bolted, as shown at 11, to opposite sides of the carrier bars 7. These beams are inclined downwardly, and are provided with ears 12 at their front ends, which are arranged to be attached to the evener bar 13 of a harrow, or to any other suitable agricultural implement by bolts 14, or other adequate means.

A pivot eye bolt has an upright shank 15 journaled in the front end of the carrier beam, its eye 16 being located below the beam. A track 17 is disposed transversely of an intermediate portion of the beam and beneath the same, said track inclining upwardly in opposite directions and having a central seat 18. A bearing block 19 is interposed between this seat and the carrier beam 7, while brackets 20, secured to the opposite sides of the beam, have their outer ends fastened to the ends of the track, as shown at 21. It will be observed that the terminals of said track are downturned, as at 22 to provide stops.

The ground support for the carrier beam and seat is in the form of a frame, comprising an axle 23 disposed transversely of the beam, and a central forwardly extending pivot bar 24, arranged longitudinally of and below said beam. Ground wheels 25 are rotatably mounted on the ends of the axle, and are disposed on opposite sides of the carrier beam 7, and pivot bar 24. Braces 26 connect the forward portion of the pivot bar with the axle on opposite sides of the connection between the rear end of said pivot bar and said axle. The front end of the pivot bar is rotatably mounted on a horizontal and longitudinal axis in the eye 16 of the pivot bolt 15. The longitudinal movement is prohibited by a head 27 and by a pin 28 carried by the pivot bar 24 and located on opposite sides of the eye 16, as clearly shown in Fig. 3. A roller 29 is journaled on the pivot bar 24 between retaining pins 30, and this roller operates against the under side of the guide track 17, being normally located in the central seat 18. A suitable foot rest 31 is located on the carrier beam in convenient relation to the seat 9.

The operation of the structure may be briefly described as follows. The attachment is connected to a harrow or other draft implement, as shown in Fig. 1, and it will be evident that as the harrow is moved across a field, the wheels can swing freely in upright directions without affecting the seat, inasmuch as the pivot bar 24 can rotate on its longitudinal axis. At the same time, the wheels and the supporting frame, to which they are connected, can swing in a horizontal direction, while the carrier bar and seat will be properly supported as the roller 29 will move upon the track 17. This movement, however, is limited by the end stops 22. It will thus be evident that no matter how rough, rugged or sloping the ground may be, the wheels will travel upon the same, and turns and curves can be made without materially affecting the seat 9.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In an attachment of the character set forth, the combination with a carrier having an eye, of means for attaching the carrier to an implement, and a ground support for the carrier having a rotatable engagement in the eye and having a laterally movable bearing against the carrier.

2. In an attachment of the character set forth, the combination with a carrier beam, of means for attaching said beam to an implement, an eye bolt secured in the beam, and a ground support for the carrier beam having a portion rotatably engaged in the eye of the bolt and also having a laterally movable bearing against the beam in rear of said eye.

3. In an attachment of the character set forth, the combination with a carrier beam, of reach bars for securing the same to an implement, a seat mounted on the carrier beam, an eye bolt secured to the beam and having its eye located below the same, and a wheeled support having a forwardly extending pivot bar journaled in the eye.

4. In an attachment of the character set forth, the combination with a carrier beam, of divergently disposed reach bars secured thereto, a seat mounted on the rear end of the beam, a vertically disposed eye bolt secured in the front end of the beam and having its eye arranged below the same, an axle arranged transversely of the beam and having wheels located on opposite sides of said beam, and a pivot bar secured to the axle and having its front end journaled in the eye of the bolt, said pivot bar extending longitudinally beneath the carrier beam.

5. In an attachment of the character set forth, the combination with a carrier beam, of a seat mounted thereon, reach bars secured to the beam, a pivot eye bolt journaled in the beam, an axle disposed transversely of the beam and having wheels rotatably mounted thereon on opposite sides of the beam, and a pivot bar connected to the axle and disposed longitudinally of the beam, said pivot bar being journaled in the eye of the pivot bolt.

6. In an attachment of the character set forth, the combination with a carrier, of a seat mounted thereon, a support journaled on the carrier in advance of the seat, and having its axis of movement normally disposed longitudinally of the carrier, and means for attaching the carrier to an implement.

7. In an attachment of the character set forth, the combination with a carrier, of a seat mounted thereon, a support rotatably connected to the carrier in advance of the seat and on a substantially horizontal axis, and means for attaching the carrier to an implement.

8. In an attachment of the character set forth, the combination with a carrier, of a seat mounted thereon, a support pivotally and rotatably connected to the carrier in advance of the seat and having a laterally movable bearing against the same in rear of its connection, and means for attaching the carrier to an implement.

9. In an attachment of the character set forth, the combination with a carrier beam, of a seat mounted on the rear end thereof, an eye bolt rotatably mounted in the beam in advance of the seat, and a wheeled support including a forwardly projecting pivot bar journaled in the eye of the bolt, said support being capable of a swinging movement with the eye bolt as an axis.

10. In an attachment of the character set forth, the combination with a carrier, of means for attaching the same to an implement, a support for the carrier pivoted thereto and swinging transversely thereof, a guide track disposed transversely of the carrier and having an intermediate portion engaged therewith, brackets connecting the ends of the track and the carrier independently of said engaged portion, and a roller journaled on the support and operating against the guide track.

11. In an attachment of the character set forth, the combination with a carrier, of means for attaching the same to an implement, a track disposed transversely of the carrier, a support for the carrier including a swinging pivot bar, rotatably connected to the carrier in advance of the track and operating against the track, and a seat mounted on the carrier.

12. In an attachment of the character set forth, the combination with a carrier, of a seat mounted thereon, means for attaching the carrier to an implement, a track disposed transversely of the carrier and secured thereto, a support for the carrier including a swinging and rotatable pivot bar having a pivoted and rotatable connection with the carrier in advance of the track, and a roller mounted on the pivot bar and operating against the track.

13. In an attachment of the character set forth, the combination with a carrier beam, of reach bars secured thereto, a seat mounted on the carrier beam, a pivot eye bolt journaled in the carrier beam, an axle disposed transversely of the carrier beam and beneath the same, wheels journaled on the axle, a pivot bar rotatably mounted in the eye bolt and having a swinging movement, said pivot bar being connected to the axle, a track disposed transversely of the carrier beam and having a central seat, brackets connecting the ends of the track to the carrier beam, and a roller journaled on the pivot bar and operating against the track, said roller normally resting in the seat of said track.

14. In an attachment of the character set forth, the combination with a carrier beam, of means for attaching the same to an implement, a seat mounted on the rear end of the beam, an eye bolt located in the front end of the beam, a track secured transversely of the beam between the eye bolt and seat, and a wheeled support including a swinging pivot bar having a bearing against the track and having its front end rotatably engaged in the eye of the bolt.

In testimony, that I claim the foregoing as my own, I have hereto affixed my signature in the presence of two witnesses.

DEWITT SPENSLEY.

Witnesses:
JOHN H. SIGGERS,
BLANCHE J. KALDENBACK.